UNITED STATES PATENT OFFICE.

CARL JAGERSPACHER AND BERTHOLD WUTH, OF BASEL, SWITZERLAND, ASSIGNORS TO SOCIETY OF CHEMICAL INDUSTRY IN BASLE, OF BASEL, SWITZERLAND.

COPPER COMPOUNDS OF ORTHOOXYAZO DYESTUFFS AND A PROCESS OF MAKING SAME.

1,216,812.     Specification of Letters Patent.     Patented Feb. 20, 1917.

No Drawing.     Application filed October 7, 1915. Serial No. 54,503.

*To all whom it may concern:*

Be it known that we, CARL JAGERSPACHER, chemist, a citizen of the Swiss Republic, and BERTHOLD WUTH, chemist, a subject of the King of Great Britain, both residents of Basel, Switzerland, have invented new Copper Compounds of Orthooxyazo Dyestuffs and a Process of Making Same, of which the following is a full, clear, and exact specification.

In the United States application for Letters Patent Ser. No. 43413, filed August 3, 1915 is described the production of new, well defined copper compounds of orthooxyazo dyestuffs, which are soluble in water. We have now found that the orthooxyazo dyestuffs derived from a betacetonaldehyde derivative, in which an alkyl alkyloxy- and alkylamino group is substituted for the aldehydic hydrogen, that is to say which result from the combination of derivatives of orthodiazophenol or orthodiazonaphthol with the said betacetonaldehyde derivatives, can also be transformed into new copper compounds by their treatment with copper compounds as for instance copper salts, copper oxid or copper hydroxid. The copper compounds soluble in water thus obtained, from which the copper cannot be precipitated by sodium carbonate, soda lye and ammonia, possess the valuable property to dye the animal fibers, as wool, silk and leather, straw and woodbast directly in an acid bath vivid greenish yellow to orange-brown tints of excellent fastness to washing and to light. In a dry state, they constitute yellow to brown powders which dissolve in concentrated sulfuric acid forming yellow to red-orange solutions.

Among the derivatives of betacetonaldehyde suitable to be employed as parent materials for the preparation of the ortho azooxy dyestuffs to be transferred into copper compounds may be signalized the acetylacetic ester, the benzoylacetic ester, the acetylacetone, the benzoylacetone, the acetylacetic anilid, the benzoylacetic anilid.

Example 1: 20 parts of the dyestuff resulting from the combination of orthodiazophenolsulfonic acid with acetylacetic anilid are dissolved in 500 parts water and to the thus obtained solution is added, at a temperature of 70° C. a solution of 13 parts copper sulfate in about 50 parts water. The freed sulfuric acid is neutralized with sodium carbonate or sodium acetate and the yellow green copper compound is separated by filtration, pressed and dried. It dies wool from an acid bath very equable green-yellow tints which are very fast to washing and to light.

Example 2: 20 parts of the dyestuff resulting from orthodiazophenolsulfonic acid and benzoylacetone are dissolved in 400 parts hot water and the thus obtained solution is added at about 70° C. a solution of 13 parts copper sulfate in 50 parts water. The coloration of the originally pure orange-red solution turns to green-brown. By addition of common salt the copper compound is precipitated in form of sandy brown-yellow crystals. It yields on wool in an acid bath orange-brown tints fast to washing and to light.

The following tabular exhibit relates to several copper compounds obtainable according to the new process:

| Copper compound of the dyestuff resulting from the diazo derivative— | | Dying from acid bath on wool. |
|---|---|---|
| Of— | And— | |
| 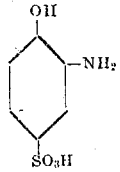 | Acetylacetic ester.<br>Benzoylacetic ester.<br>Benzoylacetone.<br>Acetylacetic anilid.<br>Benzoylacetic anilid. | Green-yellow.<br>Orange-brown.<br>Orange-brown.<br>Green-yellow.<br>Yellow. |
| 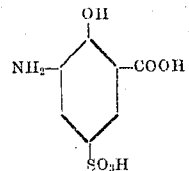 | Acetylacetic anilid.<br>Benzoylacetic anilid. | Green-yellow.<br>Yellow. |
| 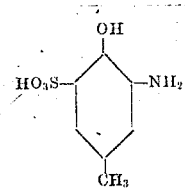 | Benzoylacetone.<br>Benzoylacetic anilid. | Orange.<br>Orange. |

What we claim is:

1. The described process for the manufacture of new copper compounds of orthooxyazo dyestuffs, soluble in water, consisting in acting with copper compounds in a watery medium on the orthooxyazo dyestuffs derived from a betacetonaldehyde derivative in which an alkyl-, alkyloxy- or alphylamino group is substituted for the aldehydic hydrogen.

2. The described process for the manufacture of new copper compounds of orthooxyazo dyestuffs, soluble in water, consisting in acting with copper compounds in a watery medium on the orthooxyazo dyestuffs resulting from the combination of an orthodiazophenol derivative with a betacetonaldehyde derivative in which an alkyl-, alkyloxy- or alphylamino group is substituted for the aldehydic hydrogen.

3. As new products the described new copper compounds of orthooxyazo dyestuffs, which are soluble in water, from which the copper cannot be precipitated with sodium carbonate, soda lye and ammonia, and which constitute yellow to brown powders dissolving in concentrated sulfuric acid to yellow to red-orange solutions, and in water to yellow to brown solutions which do not change on addition of sodium carbonate or soda lye, and from which the animal fibers, as wool, silk and leather, straw and wood-bast are dyed, according to the methods used for acid dyestuffs, greenish-yellow to orange-brown tints showing without any further treatment a very good fastness to washing and to light.

In witness whereof we have hereunto signed our names this 11th day of September 1915, in the presence of two subscribing witnesses.

DR. CARL JAGERSPACHER.
DR. BERTHOLD WUTH.

Witnesses:
ARNOLD ZUBER,
AMAND RITTER.